US012447990B2

(12) United States Patent
Tatsumoto et al.

(10) Patent No.: US 12,447,990 B2
(45) Date of Patent: Oct. 21, 2025

(54) INFORMATION PROVIDING SYSTEM

(71) Applicant: TOYOTA JIDOSHA KABUSHIKI KAISHA, Toyota (JP)

(72) Inventors: Yuki Tatsumoto, Seto (JP); Ryutaro Tomita, Tokyo (JP); Mami Noguchi, Nagoya (JP); Kenichiro Sugihara, Kounosu (JP); Hiroyuki Nakajima, Tokyo (JP); Yuko Nagai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 18/667,129

(22) Filed: May 17, 2024

(65) Prior Publication Data
US 2024/0409111 A1 Dec. 12, 2024

(30) Foreign Application Priority Data
Jun. 6, 2023 (JP) .................. 2023-093066

(51) Int. Cl.
*B60W 50/14* (2020.01)
*B60K 35/28* (2024.01)
(52) U.S. Cl.
CPC ............ *B60W 50/14* (2013.01); *B60K 35/28* (2024.01); *B60K 2360/1868* (2024.01); *B60K 2360/566* (2024.01); *B60W 2050/146* (2013.01); *B60W 2556/10* (2020.02)
(58) Field of Classification Search
CPC ............ B60W 50/14; B60W 2556/10; B60W 2050/146; B60K 35/28; B60K 2360/1868; B60K 2360/566
See application file for complete search history.

(56) References Cited

U.S. PATENT DOCUMENTS

| | | | | |
|---|---|---|---|---|
| 9,625,266 | B1 * | 4/2017 | Chintakindi | ....... G01C 21/3484 |
| 11,145,202 | B1 * | 10/2021 | Buentello | .............. G08G 1/141 |
| 2012/0150438 | A1 * | 6/2012 | Hwang | ............ G08G 1/096758 |
| | | | | 701/468 |
| 2012/0215432 | A1 * | 8/2012 | Uyeki | .............. G08G 1/096838 |
| | | | | 701/119 |
| 2017/0032402 | A1 * | 2/2017 | Patsiokas | ........... G06Q 30/0207 |

(Continued)

FOREIGN PATENT DOCUMENTS

| | | | |
|---|---|---|---|
| JP | 2004171060 A | * | 6/2004 |
| JP | 2018-55296 A | | 4/2018 |
| JP | 7270327 B2 | * | 5/2023 |

*Primary Examiner* — Chico A Foxx
(74) *Attorney, Agent, or Firm* — Oblon, McClelland, Maier &Neustadt, L.L.P.

(57) ABSTRACT

An information providing system includes a memory device that stores accident-prone location information including items. Each of the items includes position information of a spot that requires attention of a driver and a precaution related to the spot. The processing circuitry is configured to store, in the memory device, history information indicating whether the driver has been notified of each of the items. The processing circuitry is configured to extract, based on the accident-prone location information, the history information, and the planned travel route, an item of which the driver has not been notified. The item corresponds to a spot included in the planned travel route. The processing circuitry is configured to notify the driver of the extracted item before the driver starts driving.

3 Claims, 4 Drawing Sheets

(56) References Cited

U.S. PATENT DOCUMENTS

| | | | |
|---|---|---|---|
| 2018/0283897 A1* | 10/2018 | Wang | G06Q 30/0214 |
| 2019/0241198 A1* | 8/2019 | Mori | G08G 1/16 |
| 2023/0116939 A1* | 4/2023 | Spiro | H05B 47/105 |
| | | | 362/382 |

* cited by examiner

Fig.2

| Spot | Accident-Prone Location Information ||||||| History Information ||
| | Traveling Direction | Vehicle Type | Time of Day | Day of Week | Weather | Precaution | Driver A Notified? | Driver B Notified? | |
| --- | --- | --- | --- | --- | --- | --- | --- | --- | --- |
| P1 | — | — | — | — | — | ... | NO | YES | ... |
| P2 | — | — | — | — | — | ... | NO | YES | ... |
| P3 | — | Large-Sized Vehicle | — | — | — | ... | NO | YES | ... |
| P4 | West | — | Dusk | — | Sunny | ... | NO | YES | ... |
| ... | ... | ... | ... | ... | ... | ... | ... | ... | ... |

INFORMATION PROVIDING SYSTEM

RELATED APPLICATION

The present application claims priority of Japanese Patent Application No. 2023-093066 filed on Jun. 6, 2023, the disclosure of which is hereby incorporated by reference herein in its entirety.

BACKGROUND

1. Field

The following description relates to an information providing system.

2. Description of Related Art

Japanese Laid-Open Patent Publication No. 2018-055296 describes an information processing device that issues an alert message to a driver when the vehicle approaches an accident black spot. The alert message prompts the driver to pay attention to the accident black spot.

When the driver repeatedly drives through the accident black spot, the information processing device issues the alert message to the driver each time. Since the driver is repeatedly reminded of the same item, the driver may feel uncomfortable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information providing system includes a memory device and processing circuitry. The memory device stores accident-prone location information including items. Each of the items includes position information of a spot that requires attention of a driver and a precaution related to the spot. The processing circuitry is configured to store, in the memory device, history information indicating whether the driver has been notified of each of the items. The processing circuitry is configured to obtain information on a planned travel route of a vehicle driven by the driver. The processing circuitry is configured to extract, based on the accident-prone location information, the history information, and the planned travel route, an item of which the driver has not been notified. The item corresponds to a spot included in the planned travel route. The processing circuitry is configured to notify the driver of the extracted item before the driver starts driving.

Other features and aspects will be apparent from the following detailed description, the drawings, and the claims.

BRIEF DESCRIPTION OF THE DRAWINGS

FIG. 2 is a diagram illustrating one example of accident-prone location information and history information.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An information providing system in accordance with an embodiment will now be described with reference to the drawings.

Schematic Diagram of Information Providing System 10

Figure 1:
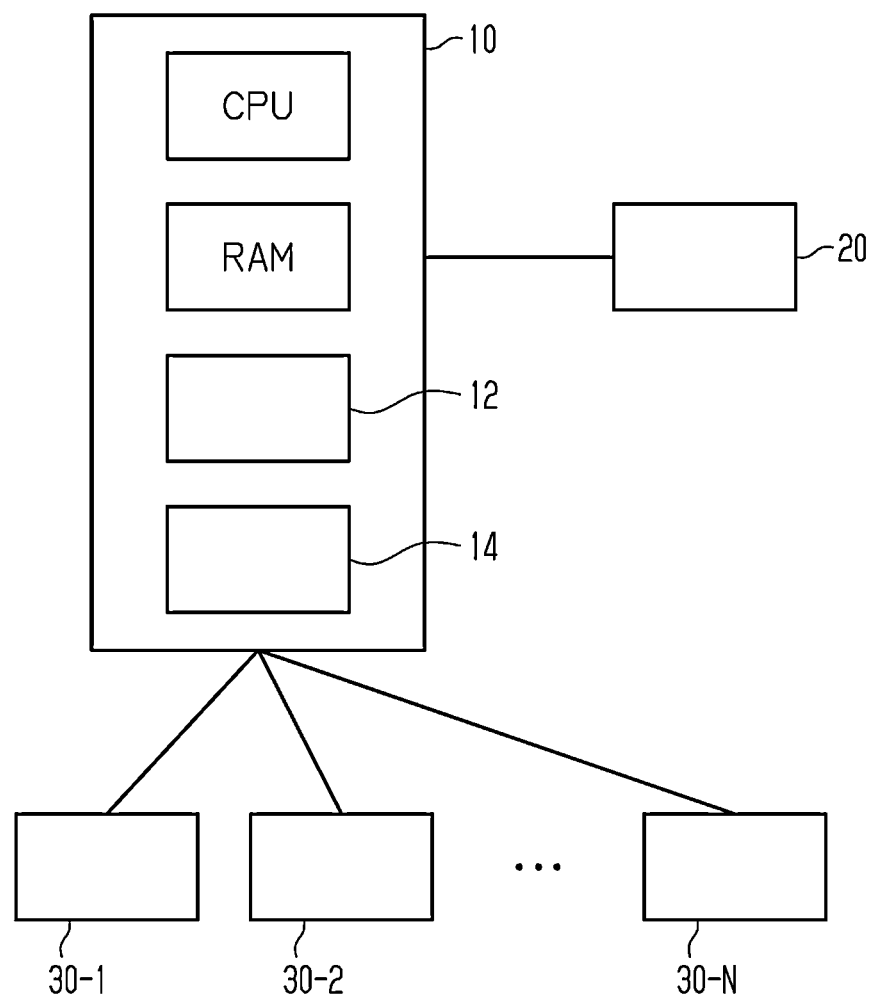
FIG. 1 is a schematic diagram of an information providing system according to an embodiment.

FIG. 1 shows an information providing system 10. The information providing system 10 includes a central processing unit (CPU), a random-access memory (RAM), a memory device 12, and a communication device 14. The memory device 12 is, for example, a read-only memory (ROM). The CPU of the information providing system 10 is configured to communicate with an administrator terminal 20 and driver terminals 30-1, 30-2, . . . , and 30-N via the communication device 14.

In the present embodiment, the information providing system 10 is used when a driver, who is an employee of a package delivery company, delivers packages. The driver terminals 30-1, 30-2, . . . , and 30-N are computers respectively provided for drivers. The computer may be a mobile terminal or a desktop computer. For example, a driver inputs a planned travel route to the computer. In response to the input, the information providing system 10 executes a process illustrated in FIG. 3, which is described later. The driver terminal 30-1, 30-2, . . . , and 30-N may be a car navigation device installed in a vehicle. In such a case, the driver inputs his or her identification information and a planned travel route to the car navigation device before the driver starts driving the vehicle. This allows the navigation device to notify the information providing system 10 that the driver corresponding to the identification information is about to start driving the vehicle. In response to the notification, the information providing system 10 executes the process illustrated in FIG. 3, which is described later.

The memory device 12 of the information providing system 10 stores accident-prone location information and history information, as described below with reference to FIG. 2. The history information indicates whether a driver has been notified of each of items included in the accident-prone location information. The CPU of the information providing system 10 notifies the driver of only items of which the driver has not been notified. Further, each item corresponds to a spot included in the planned travel route. The notified item matches one or more conditions (if specified), which are described later.

Example of Accident-Prone Location Information and History Information

An example of the accident-prone location information and the history information will now be described with reference to FIG. 2. The memory device 12 stores the accident-prone location information including items. Each of the items includes position information of a spot that requires the attention of a driver, one or more conditions, and a precaution related to the spot. The one or more conditions are a traveling direction of the vehicle, the vehicle type, the time of day, the day of the week, and the weather. For example, a precaution such as "The driver needs to be cautious because spot P1 is an intersection without a traffic light." is associated with spot P1. For example, a precaution such as "The driver needs to be cautious because spot P2 is a steep hill." is associated with spot P2. The traveling direction, the vehicle type, the time of day, the day of the week, and the weather are not specified for spots P1 and P2. That is, when any driver is scheduled to drive through spot P1 for the first time, the driver will be notified of the precaution associated with spot P1. In the same manner, when any driver is scheduled to drive through spot P2 for the first time, the driver will be notified of the precaution associated with spot P2.

At spot P3, the vehicle type is specified as a large-sized vehicle. For example, a precaution such as "The driver of a large-sized vehicle needs to be cautious because spot P3 is a narrow place." is associated with spot P3. At spot P3, the traveling direction of the vehicle, the time of day, the day of the week, and the weather are not specified. Thus, when a driver of a large-sized vehicle is scheduled to drive through spot P3 for the first time, the driver is notified of the precaution associated with spot P3. In contrast, for example, a driver of a middle-sized vehicle will not be notified of the precaution associated with spot P3 regardless of whether the driver is scheduled to drive through spot P3 for the first time.

At spot P4, the traveling direction is specified as west, the time of day is specified as dusk, and the weather is specified as sunny. For example, a precaution such as "The setting sun dazzles at spot P4, so the driver needs to be cautious toward west at dusk of a sunny day." is associated with spot P4. At spot P4, the vehicle type and the day of the week are not specified. Thus, any driver who is scheduled to drive through spot P4 toward west at dusk of a sunny day for the first time will be notified of the precaution associated with spot P4. In contrast, for example, a driver who is scheduled to drive through spot P4 toward south will not be notified of the precaution associated with spot P4 regardless of whether the driver is scheduled to drive through spot P4 for the first time.

The CPU of the information providing system 10 stores, in the memory device 12, the history information indicating whether the drive has been notified of each of the items. In the example shown in FIG. 2, driver A has not been notified of any of the precautions associated with spots P1 to P4. Driver B has been notified of all of the precautions associated with spots P1 to P4. The history information is used in step S302 of FIG. 3, which will be described later, to extract an item of which the drive has not been notified.

Process Executed by Information Providing System 10

Figure 3:
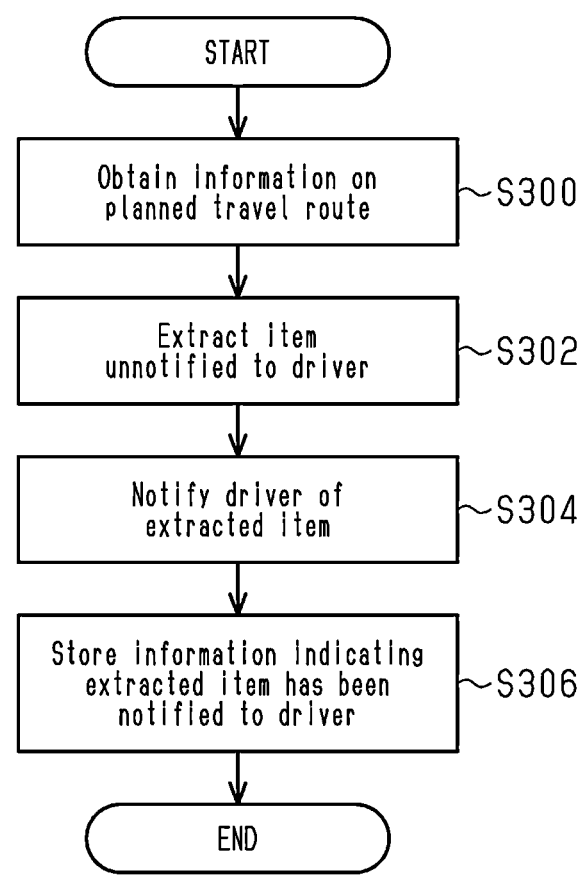
FIG. 3 is a flowchart illustrating a process executed by the information providing system shown in FIG. 1.

A process executed by the information providing system 10 will now be described with reference to FIG. 3. Driver A has the terminal 30-1. Driver A inputs a planned travel route to the terminal 30-1. In response to the input, the terminal 30-1 transmits information on the planned travel route to the information providing system 10. In this manner, the information providing system 10 obtains the information on the planned travel route of the vehicle driven by the driver (step S300). Then, the information providing system 10 extracts an item based on the accident-prone location information, the history information of driver A, and the information on the planned travel route (step S302). The extracted item corresponds to a spot included in the planned travel route, and driver A has not been notified of the item. Subsequently, the information providing system 10 notifies driver A and the administrator of the extracted item before driver A starts driving (step S304). The CPU of the information providing system 10 displays a notification about the extracted item on the terminal 30-1 of driver A through communication performed by the communication device 14. The CPU of the information providing system 10 may display the notification about the extracted item on the terminal 20 of the administrator of driver A through communication performed by the communication device 14. The information providing system 10 stores, in the memory device 12, information indicating that driver A has been notified of the extracted item (step S306).

Operation of the Present Embodiment

Figure 4:
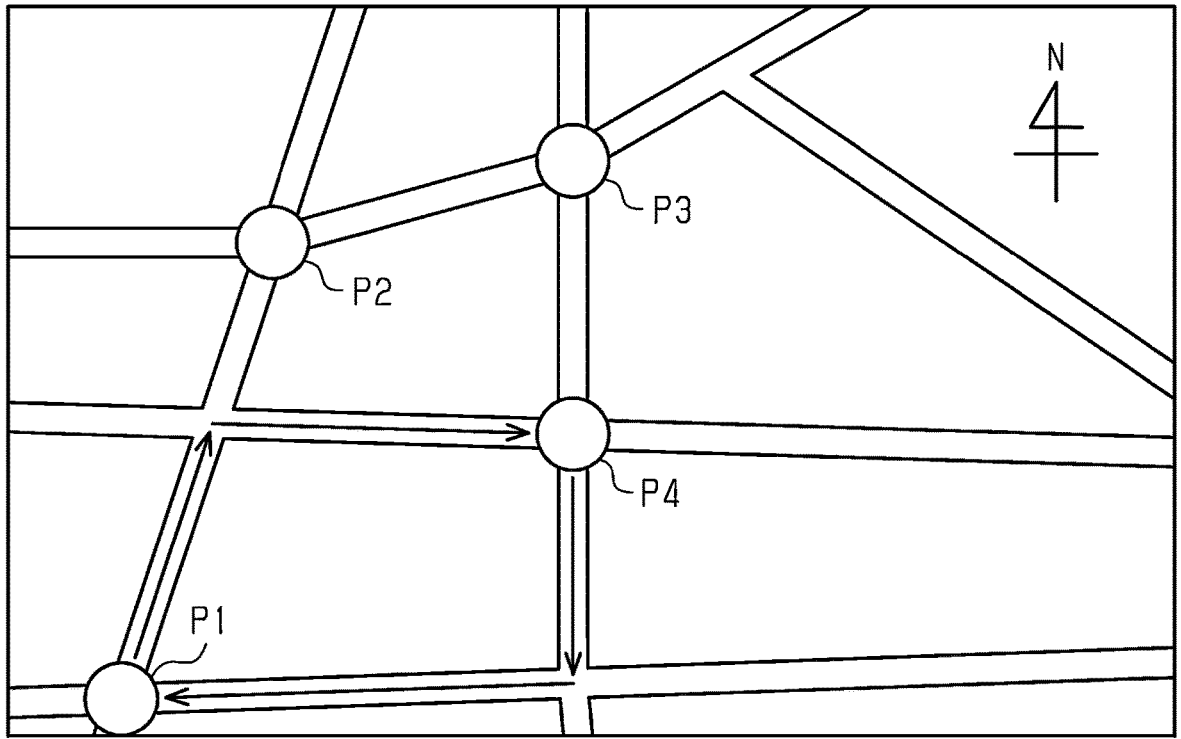
FIG. 4 is a diagram illustrating the operation of the present embodiment.
Figure 5:
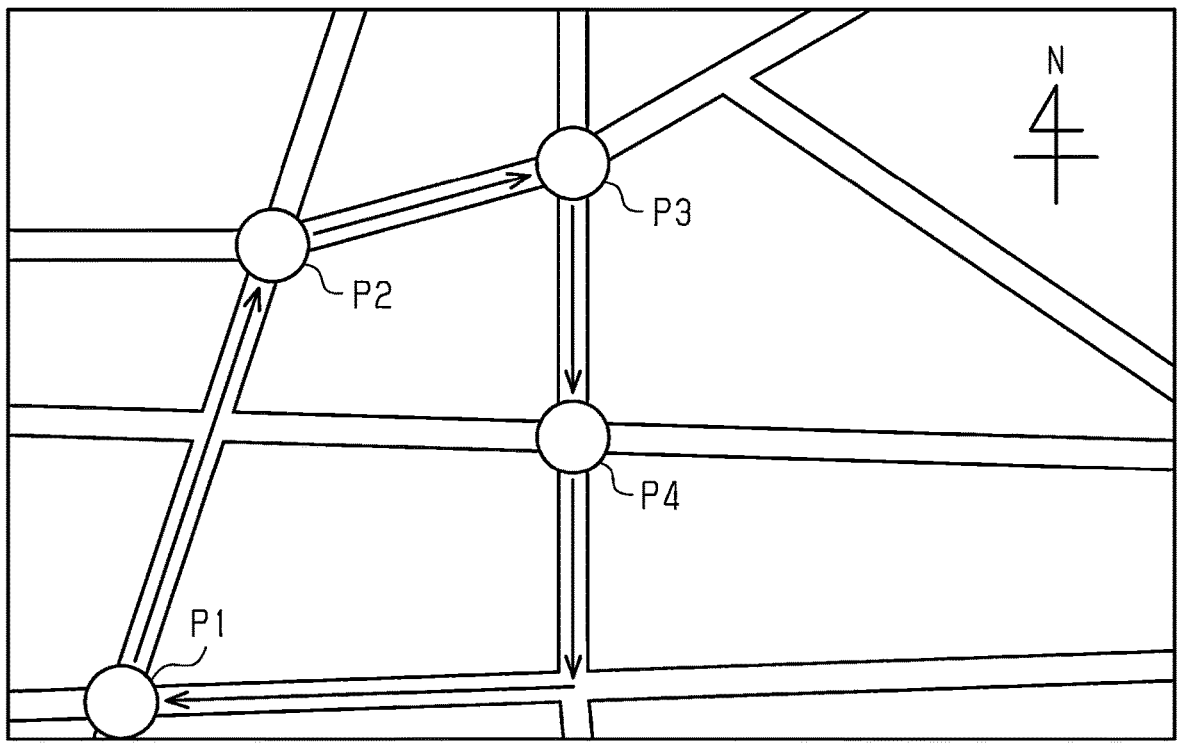
FIG. 5 is a diagram illustrating the operation of the present embodiment.

The operation of the present embodiment will now be described with reference to FIGS. 4 and 5. In FIGS. 4 and 5, the upward direction is the north direction. The memory device 12 stores in advance information indicating that driver A drives a middle-sized vehicle.

FIG. 4 shows a planned travel route for a case in which driver A travels in the area shown in FIG. 4 for the first time. The history information of driver A indicates that driver A has not been notified of the items corresponding to spots P1, P2, P3, and P4 (refer to FIG. 2).

As described above, the information providing system 10 extracts an item based on the accident-prone location information, the history information of driver A, and the information of the planned travel route (step S302). As shown in FIG. 4, the planned travel route for driver A includes spot P1 and spot P4. As described above, when any driver is scheduled to drive through spot P1 for the first time, the driver will be notified of the precaution associated with spot P1. Driver A is scheduled to drive through spot P4 toward east. The precaution associated with spot P4 is unnecessary when the driver will not drive through spot P4 toward west. Therefore, the information providing system 10 extracts only the item related to spot P1 based on the accident-prone location information, the history information of driver A, and the planned travel route.

Next, the CPU of the information providing system 10 notifies driver A of the item related to spot P1 (step S304). Subsequently, the CPU of the information providing system 10 stores, in the memory device 12, information indicating that driver A has been notified of the item related to spot P1 (step S306).

FIG. 5 shows a case in which driver A drives a travel route that partially overlaps the travel route shown in FIG. 4 after driving the travel route shown in FIG. 4. The travel route shown in FIG. 5 includes spot P1, spot P2, spot P3, and spot P4. Driver A has been notified of the item corresponding to spot P1 before driver A starts driving the travel route shown in FIG. 5. Driver A has not been notified of the items corresponding to spot P2, spot P3, and spot P4. As described above, when any driver is scheduled to drive through spot P2 for the first time, the driver is notified of the precaution associated with spot P2. A driver of a middle-sized vehicle will not be notified of the precaution associated with spot P3 regardless of whether the driver is scheduled to drive through spot P3 for the first time. The driver who is scheduled to drive through spot P4 toward south will not be notified of the precaution associated with spot P4 regardless of whether the driver is scheduled to drive through spot P4 for the first time. As shown in FIG. 5, driver A is scheduled to drive through spot P4 toward south. Therefore, the information providing system 10 extracts only the item related to spot P2 based on the accident-prone location information, the history information of driver A, and the planned travel route (step S302). That is, the item related to spots P1 is not extracted at this time.

Next, the CPU of the information providing system 10 notifies driver A of the item related to spot P2 (step S304). Subsequently, the CPU of the information providing system 10 stores, in the memory device 12, information indicating that driver A has been notified of the item related to spot P2 (step S306).

Advantages of Present Embodiment (1) The information providing system 10 includes the memory device 12 and the CPU. The memory device 12 stores the accident-prone location information including items. Each of the items includes the position information of a spot that requires the attention of a driver and a precaution related to the spot. The CPU is configured to store, in the memory device 12, the history information indicating whether the driver has been notified of each of the items. The CPU is configured to obtain information on a planned travel route of a vehicle driven by the driver. The CPU is configured to extract, based on the accident-prone location information, the history information, and the planned travel route, an item of which the driver has not been notified. The item corresponds to a spot included in the planned travel route. The CPU is configured to notify the driver of the extracted item before the driver starts driving.

The above configuration will not notify the driver of the item that has already been notified to the driver. This avoids a situation in which the driver is repeatedly notified of the same item.

(2) The information providing system 10 includes the communication device 14. The CPU is configured to display a notification about the extracted item on the terminal 30-1 of driver A through communication performed by the communication device 14.

The above configuration will notify driver A of the precaution. This leads to the prevention of accidents.

(3) The information providing system 10 includes the communication device 14. The CPU is configured to display a notification about the extracted item on the terminal 20 of the administrator of the driver through communication performed by the communication device 14.

With the above configuration, the administrator can readily advise the drive of the precaution. This leads to the prevention of accidents.

Modified Examples

The present embodiment may be modified as described below. The present embodiment and the following modifications can be combined as long as the combined modifications remain technically consistent with each other.

In the above embodiment, each of the items includes the position information of a spot that requires the attention of the driver, the traveling direction of the vehicle, the vehicle type, the time of day, the day of the week, the weather, and the precaution related to the spot. However, this is merely an example. For example, each of the items may include only the position information of a spot that requires the attention of the driver and the precaution related to the spot.

In the above embodiment, four items respectively correspond to spots P1, P2, P3, and P4. However, this is merely an example. For example, two or more items may correspond to spot P1.

In the above embodiment, the information providing system 10 notifies the driver and the administrator of the extracted item before the driver starts driving (step S304). However, this is merely an example. For example, the administrator does not have to be notified. Alternatively, the driver does not have to be notified.

In the above embodiment, the CPU of the information providing system 10 is configured to communicate with the administrator terminal 20 and the driver terminals 30-1, 30-2, . . . , and 30-N via the communication device 14. However, this is merely an example. For example, a single computer may function as the information providing system 10, the administrator terminal 20, and the driver terminals 30-1, 30-2, . . . , and 30-N. In such a case, the driver logs in to the computer using his/her identification information. The driver inputs the planned travel route to the computer. The computer is configured to extract an item of which the driver has not been notified using the input identification information.

In the above embodiment, the information providing system 10 includes the CPU, the RAM, and the memory device 12, and executes software processing. However, this is merely an example. For example, the information providing system 10 may include an exclusive hardware circuit (for example, application specific integrated circuit, ASIC) that executes at least part of the software processing performed in the above embodiment. That is, the information providing system 10 may have any one of the following configurations (a) to (c). (a) The information providing system 10 includes a processor that executes all processes according to a program and a program storage device such as a ROM that stores the program. That is, the information providing system 10 includes a software execution device. (b) The information providing system 10 includes a program storage device and a processor that executes part of processes according to a program. The information providing system 10 further includes a dedicated hardware circuit that executes the remaining processes. (c) The information providing system 10 includes a dedicated hardware circuit that executes all processes. There may be more than one software execution device and/or more than one dedicated hardware circuit. Specifically, the above-described processes may be executed by processing circuitry including at least one of a software execution device and a dedicated hardware circuit. The processing circuitry may include more than one software execution device and more than one dedicated hardware circuit. The program storage device, or computer readable medium, includes any available medium that is accessible by a versatile or dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information providing system, comprising:
    a memory device; and
    processing circuitry, wherein:
    the memory device stores accident-prone location information including items, each of the items including position information of a spot that requires attention of a driver and a precaution related to the spot;
    the processing circuitry is configured to store, in the memory device, history information indicating whether the driver has been notified of each of the items;
    the processing circuitry is configured to obtain information on a planned travel route of a vehicle driven by the driver;
    the processing circuitry is configured to extract, based on the accident-prone location information, the history information, and the planned travel route, an item of which the driver has not been notified, the item corresponding to a spot included in the planned travel route; and
    the processing circuitry is configured to notify the driver of the extracted item before the driver starts driving.

2. The information providing system according to claim 1, the information providing system further comprising:
    a communication device,
    wherein the processing circuitry is configured to display a notification about the extracted item on a terminal of the driver through communication performed by the communication device.

3. The information providing system according to claim 1, the information providing system further comprising:
    a communication device,
    wherein the processing circuitry is configured to display a notification about the extracted item on a terminal of an administrator of the driver through communication performed by the communication device.

* * * * *